(12) United States Patent
Dai et al.

(10) Patent No.: US 6,625,453 B1
(45) Date of Patent: Sep. 23, 2003

(54) EFFICIENT WIRELESS CALL DELIVERY ACROSS REGIONAL AND POLITICAL BOUNDARIES

(75) Inventors: Weiqian Dai, Naperville, IL (US); Tony Tuong Nguyen, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/364,904

(22) Filed: Jul. 30, 1999

(51) Int. Cl.[7] .................................................. H04B 7/00
(52) U.S. Cl. ........................ 455/445; 455/433; 455/435
(58) Field of Search .................................... 455/445, 446, 455/432, 433, 435; 379/211.02, 221.13, 225

(56) References Cited

U.S. PATENT DOCUMENTS

| | | | |
|---|---|---|---|
| 5,603,084 A | * 2/1997 | Henry, Jr. et al. | 455/33.1 |
| 5,887,249 A | * 3/1999 | Schmid | 455/411 |
| 6,006,094 A | * 12/1999 | Lee | 455/445 |
| 6,061,560 A | * 5/2000 | Saboorian et al. | 455/415 |
| 6,101,382 A | * 8/2000 | Granberg | 455/414 |
| 6,259,914 B1 | * 7/2001 | Koster | 455/432 |

* cited by examiner

Primary Examiner—Nguyen T. Vo
Assistant Examiner—Thuan T. Nguyen

(57) ABSTRACT

A method of reducing, or even eliminating, the tariffs, surcharges and long-distance charges that might be incurred for calls involving wireless switching centers in multiple regions (or countries) is disclosed. This is accomplished in the illustrative embodiment by trunking calls directly from the calling wireless switching center to the visiting wireless switching center, where advantageous, without trunking the call across a regional or political boundary as is done in the prior art. The illustrative embodiment of the present invention comprises: receiving at a first wireless switching center a first call set-up message from a second wireless switching center; transmitting, in response to the first call set-up message, a second call set-up message from the first wireless switching center to a third wireless switching center; receiving, in response to the second call set-up message, a first call set-up response message at the first wireless switching center from the third wireless switching center; and transmitting, in response to the first call set-up response message, a call set-up response message from the first wireless switching center to the second wireless switching center directing the second wireless switching center to set-up a call directly with the third wireless switching center.

20 Claims, 3 Drawing Sheets

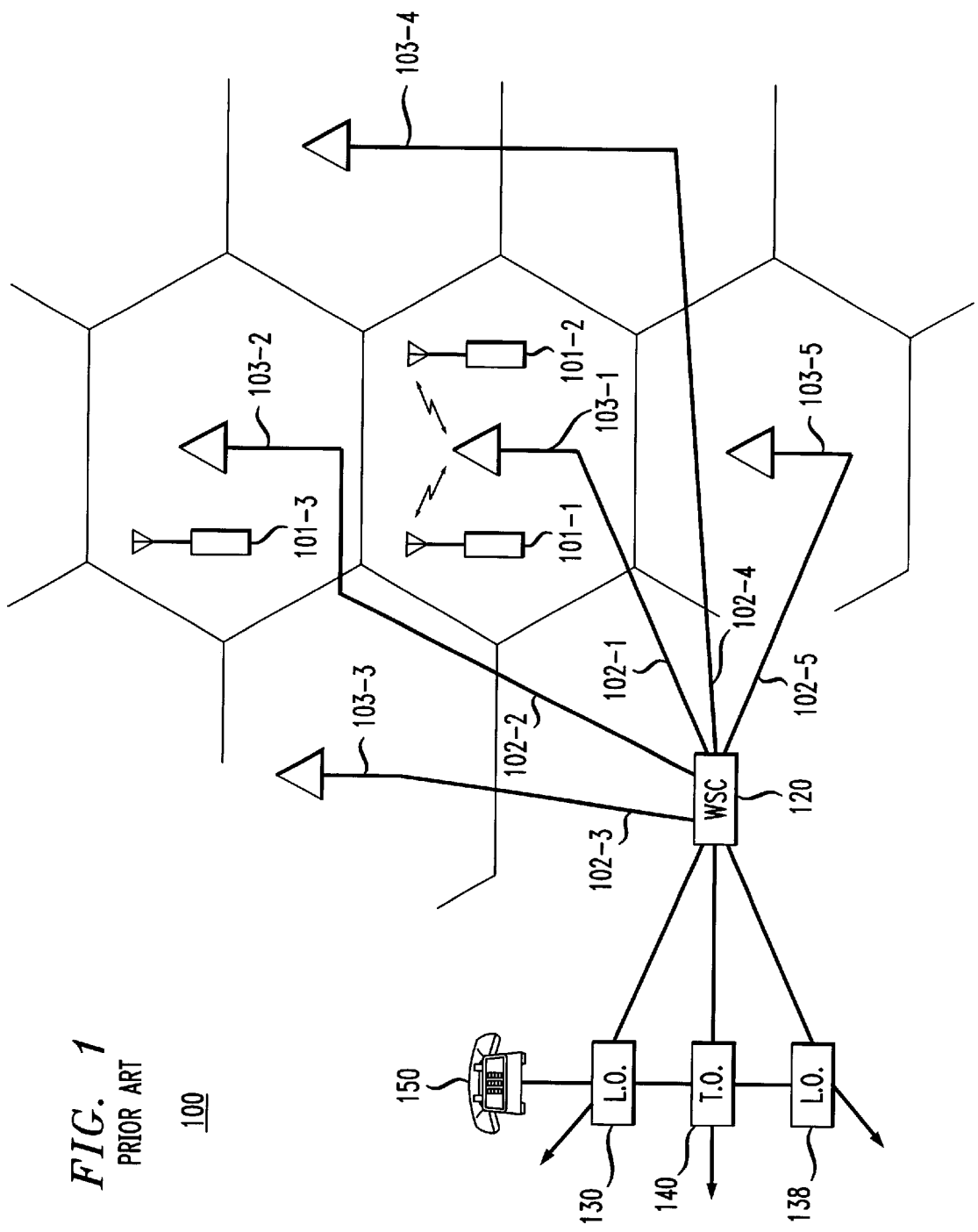

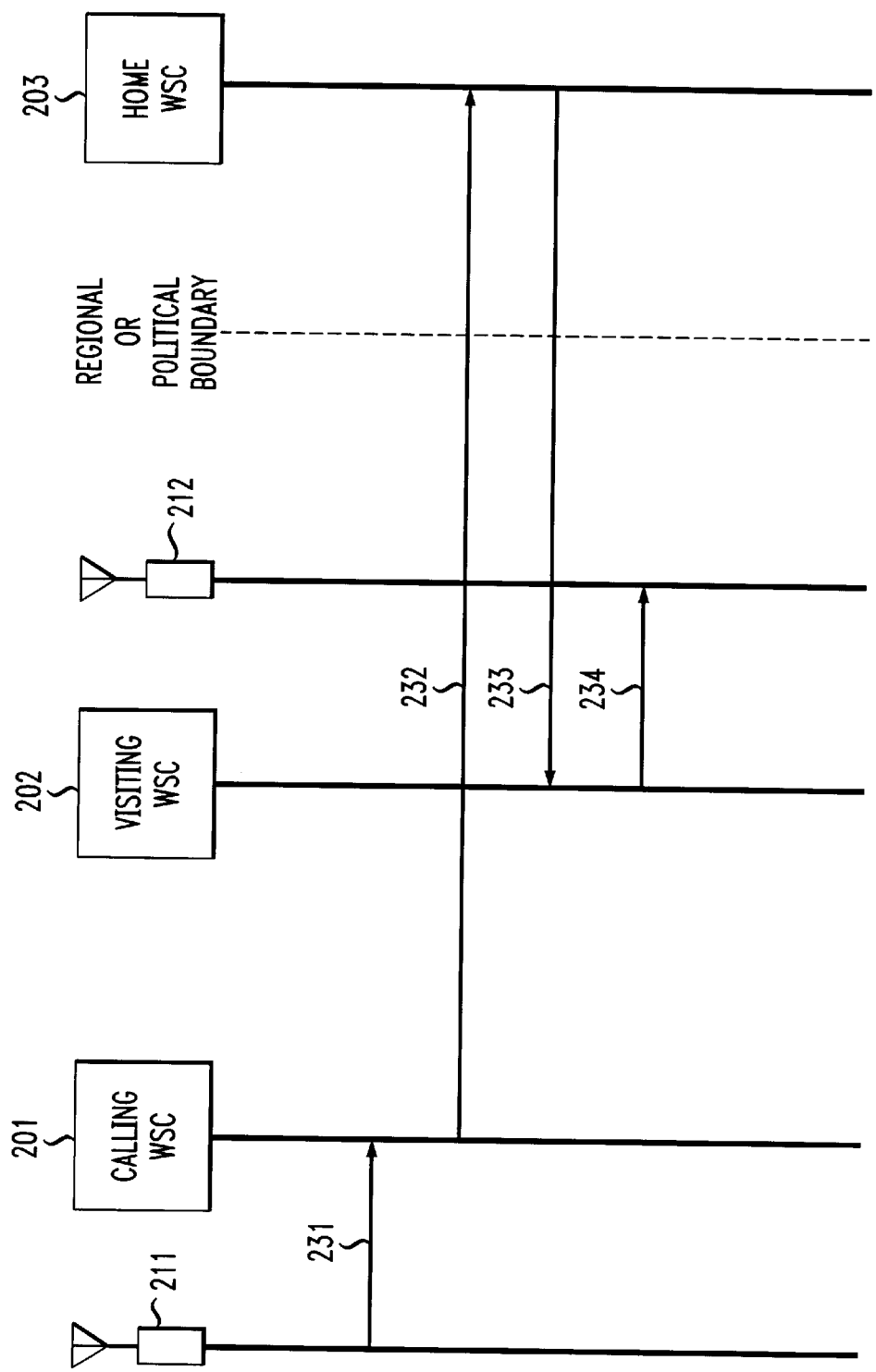

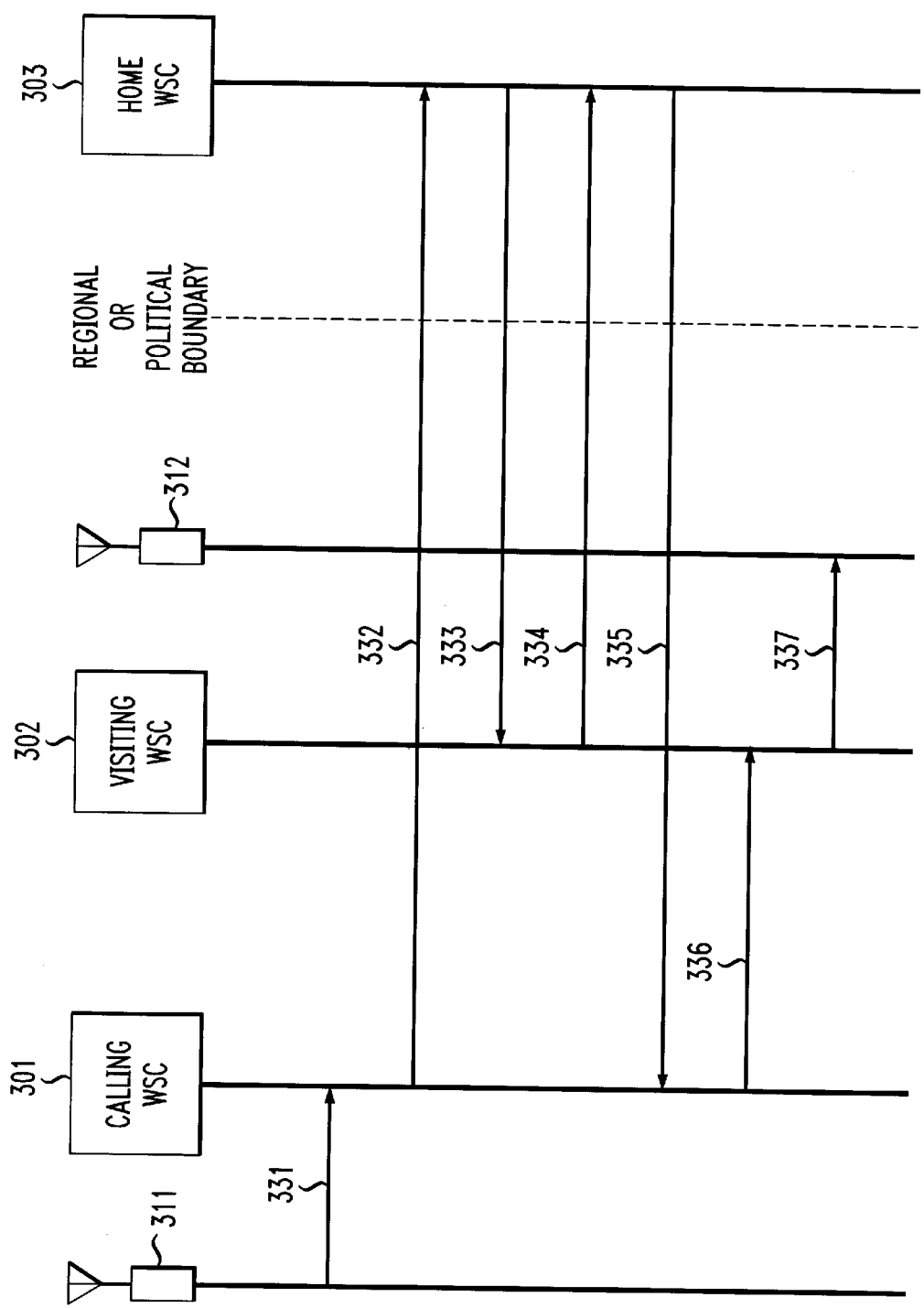

EFFICIENT WIRELESS CALL DELIVERY ACROSS REGIONAL AND POLITICAL BOUNDARIES

FIELD OF THE INVENTION

The present invention relates to telecommunications in general, and, more particularly, to a technique for setting up a wireless telecommunications call across a regional or political boundary.

BACKGROUND OF THE INVENTION

FIG. 1 depicts a schematic diagram of a portion of a typical wireless telecommunications system in the prior art, which system provides wireless telecommunications service to a number of wireless terminals (e.g., wireless terminals 101-1 through 101-3) that are situated within a geographic area. The heart of a typical wireless telecommunications system is Wireless Switching Center ("WSC") 120, which is sometimes also known as a Mobile Switching Center ("MSC") or a Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to the local and long-distance telephone and data networks (e.g., local-office 130, local-office 138 and toll-office 140). Wireless Switching Center 120 is responsible for, among other things, establishing and maintaining calls between wireless terminals and between a wireless terminal and a wireline terminal (e.g., wireline terminal 150), which is connected to the system via the local and/or long-distance networks.

The geographic area serviced by a wireless telecommunications system is partitioned into a number of spatially distinct areas called "cells." As depicted in FIG. 1, each cell is schematically represented by a hexagon; in practice, however, each cell usually has an irregular shape that depends on the topography of the terrain serviced by the system. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120 over wireline 102-1. Upon receipt of the information, and with the knowledge that it is intended for wireless terminal 101-2, Wireless Switching Center 120 then returns the information back to base station 103-1 over wireline 102-1, which relays the information, via radio, to wireless terminal 101-2.

Because a wireless terminal is mobile, it can be served by different base stations as it moves. In fact, if a wireless terminal moves a substantial distance it can be serviced by another wireless switching center and its satellite base stations rather than by the wireless terminal's "home" wireless switching center.

For example, FIG. 2 depicts a flowchart of a method in the prior art, which involves the interaction of three wireless switching centers (calling WSC 201, visiting WSC 202 and home WSC 203) and two wireless terminals (wireless terminal 211 and wireless terminal 212) as a call is established from wireless terminal 211 to wireless terminal 212.

Calling WSC 201, visiting WSC 202 and home WSC 203 are each conventional wireless switching centers as well-known to those skilled in the art. In the example in FIG. 2, calling WSC 201 and visiting WSC 202 are in the same region (or country) and both are in a different region (or country) than is home WSC 203. For example, calling WSC 201 and visiting WSC 202 might be in northern Illinois and home WSC 203 might be in Seoul, Korea.

For the purposes of this specification, the word "region" is defined as one or more geographic areas that are: (1) owned or operated by the same entity, or (2) administered by the same regulatory body. For the purposes of this specification, the word "country" is defined as a primary political unit (e.g., the United States, Canada, the United Kingdom, Japan, etc.) or a subprimary political unit (e.g., New Jersey, Alberta, Wales, Okinawa, etc.).

Wireless terminal 211 is a conventional wireless terminal that is currently served by calling WSC 201. It is irrelevant to whether wireless terminal 211 is being served by its home wireless switching center or is roaming and being served by another wireless switching center.

Wireless terminal 212 is a conventional wireless terminal whose home wireless switching center is home WSC 203. Therefore, home WSC 203 has associated with it a home location register or "HLR" (not shown) that maintains a database that includes the identity of the wireless switching center that is serving wireless terminal 212 at any given time when wireless terminal 212 is roaming.

When wireless terminal 211 desires to place a call to wireless terminal 212, it begins at step 231 by placing the call via calling WSC 201. As part of step 231, wireless terminal 211 provides an indicium (e.g., the telephone or directory number, etc.) of the identity of wireless terminal 212 to calling WSC 201 so that calling WSC 201 can determine how and where to direct the call. Calling WSC 201 analyzes the indicium, in well-known fashion, to determine that the home wireless switching center of wireless terminal 212 is home WSC 203.

Therefore, at step 232, calling WSC 201 transmits a call set-up message to home WSC 203 to indicate that calling WSC 201 desires to establish a call with wireless terminal 212, whom both calling WSC 201 and home WSC 203 know has home WSC 203 as its home wireless switching center. Typically, the call set-up message from calling WSC 201 to home WSC 203 comprises: (1) an indicium (e.g., the telephone or directory number, etc.) of the identity of wireless terminal 201 (e.g., for caller ID purposes, for billing purposes, etc.), and (2) an indicium (e.g., the telephone or directory number, etc.) of the identity of wireless terminal 202 (for routing purposes).

As part of step 232, home WSC 203 queries its home location register and determines that wireless terminal is currently being served by visiting WSC 202.

Therefore, at step 233, home WSC 203 transmits another call set-up message to visiting WSC 202 to indicate that calling WSC 201 desires to establish a call with wireless terminal 212.

Upon receipt of the call set-up message, visiting WSC 202 completes the call at step 234 to wireless terminal 212 so that wireless terminal 211 and wireless terminal 212 can communicate. Although wireless terminal 211 and wireless terminal 212 might be only a few miles apart, the call between them crosses a regional or political boundary twice! Therefore, if there are tariffs or surcharges on calls crossing regional or political boundaries the call between wireless terminal 211 and wireless terminal 212 could be horrendously expensive. Furthermore, large long-distance charges could apply for the call. Therefore, the need exists for reducing the tariffs, surcharges and long-distance charges that might be incurred for calls involving wireless switching centers in multiple regions (or countries).

SUMMARY OF THE INVENTION

Some embodiments of the present invention are capable of reducing, or even eliminating, the tariffs, surcharges and long-distance charges that might be incurred for calls involving wireless switching centers in multiple regions (or countries). This is accomplished in the illustrative embodiment by trunking calls directly from the calling wireless switching center to the visiting wireless switching center, where advantageous, without trunking the call across a regional or political boundary, as is done in the prior art.

The illustrative embodiment of the present invention comprises: receiving at a first wireless switching center a first call set-up message from a second wireless switching center; transmitting, in response to the first call set-up message, a second call set-up message from the first wireless switching center to a third wireless switching center; receiving, in response to the second call set-up message, a first call set-up response message at the first wireless switching center from the third wireless switching center; and transmitting, in response to the first call set-up response message, a call set-up response message from the first wireless switching center to the second wireless switching center directing the second wireless switching center to set-up a call directly with the third wireless switching center.

BRIEF DESCRIPTION OF THE DRAWINGS

FIG. 1 depicts a schematic diagram of a wireless telecommunications system in the prior art.

FIG. 2 depicts a flowchart of the interaction of three wireless switching centers and two wireless terminals that are involved in establishment of a call from one wireless terminal to another in the prior art.

FIG. 3 depicts a flowchart of the interaction of three wireless switching centers (calling WSC 301, visiting WSC 302 and home WSC 303) and two wireless terminals in accordance with the illustrative embodiment of the present invention.

DETAILED DESCRIPTION

FIG. 3 depicts a flowchart of the illustrative embodiment of the present invention, which involves the interaction of three wireless switching centers (calling WSC 301, visiting WSC 302 and home WSC 303) and two wireless terminals (wireless terminal 311 and wireless terminal 312) as a call is established from wireless terminal 311 to wireless terminal 312.

Calling WSC 301, visiting WSC 302 and home WSC 303 are each conventional wireless switching centers as well-known in the art, except that each is uniquely associated with a network address (e.g., an E.212 address, an IP address, etc.) and each is capable of performing the functionality described below. Advantageously, a network address uniquely identifies a wireless switching center and also enables one wireless switching center to route a call to a second wireless switching center that is only identified by its network address. Furthermore, by analyzing the network address of one wireless switching center, a second wireless switching center can determine if both wireless switching centers are in the same or different regions (or countries).

In the illustrative embodiment, calling WSC 301 and visiting WSC 302 are in the same region (or country) and both are in a different region (or country) than home WSC 303. For example, calling WSC 301 and visiting WSC 302 might be in northern Illinois and home WSC 303 might be in Seoul, Korea. Advantageously, calling WSC 301, visiting WSC 302 and home WSC 303 are all interconnected, in well-known fashion, via traffic networks (e.g., the Public Switched Telephone Network, etc.) and signaling networks (e.g., the SS-7 network, etc.).

Wireless terminal 311 is advantageously a conventional wireless terminal, as is well known to those skilled in the art, that is currently served by calling WSC 301. It is irrelevant to the present invention whether wireless terminal 311 is being served by its home wireless switching center or is roaming and being served by another wireless switching center.

Wireless terminal 312 is advantageously a conventional wireless terminal, as is well known to those skilled in the art, whose home wireless switching center is home WSC 303. Therefore, as is also well-known to those skilled in the art, home WSC 303 has associated with it a home location register or "HLR" (not shown) that maintains a database that includes the identity of the wireless switching center that is serving wireless terminal 312 at any given time when wireless terminal 312 is roaming.

In accordance with the illustrative embodiment, wireless terminal 312 is roaming and is currently being served by visiting WSC 302. When wireless terminal 312 first enters the area served by visiting WSC 302, wireless terminal 312 registers with visiting WSC 302, in well-known fashion, and visiting WSC 302 sends a message to home WSC 303 indicating that wireless terminal 312 is currently being served by visiting WSC 302. By sending a message to home WSC 303 indicating that wireless terminal 312 is currently being served by visiting WSC 302, visiting WSC 302 enables home WSC 303 to know where wireless terminal 312 is at any moment.

Referring again to FIG. 3, the illustrative embodiment begins at step 331. At step 331, wireless terminal 311 initiates a call to wireless terminal 312 by placing the call via calling WSC 301, in well-known fashion. As part of step 331, wireless terminal 311 provides an indicium (e.g., the telephone or directory number, etc.) of the identity of wireless terminal 312 to calling WSC 301 so that calling WSC 301 can determine how and where to direct the call. Calling WSC 301 analyzes the indicium, in well-known fashion, to determine that the home wireless switching center of wireless terminal 312 is home WSC 303.

Therefore, at step 332, calling WSC 301 transmits a call set-up message to home WSC 303 to indicate that calling WSC 301 desires to establish a call with wireless terminal 312, whom both calling WSC 301 and home WSC 303 know has home WSC 303 as its home wireless switching center. Advantageously, the call set-up message from calling WSC 301 to home WSC 303 comprises: (1) an indicium (e.g., the telephone or directory number, etc.) of the identity of wireless terminal 301 (e.g., for caller ID purposes, for billing purposes, etc.), (2) an indicium (e.g., the telephone or directory number, etc.) of the identity of wireless terminal 302 (for routing purposes), and (3) the network address of calling WSC 301. The network address of calling WSC 301 will be used by visiting WSC 302 in the manner described below.

As part of step 332, home WSC 303 receives the call set-up message from calling WSC 301, queries its home location register, in well-known fashion, and determines that wireless terminal 302 is currently being served by visiting WSC 302.

Therefore, at step 333 and in response to the receipt of the call set-up message from calling WSC 301, home WSC 303 transmits another call set-up message to visiting WSC 302 to indicate that calling WSC 301 desires to establish a call with wireless terminal 312 via home WSC 303. Advantageously, the call set-up message from home WSC 303 to visiting WSC 302 comprises: (1) an indicium (e.g., the telephone or directory number, etc.) of the identity of wireless terminal 301 (e.g., for caller ID purposes, for billing purposes, etc.), (2) an indicium (e.g., the telephone or directory number, etc.) of the identity of wireless terminal 302 (for routing purposes), (3) the network address of calling WSC 301, and (4) the network address of home WSC 303. The network address of calling WSC 301 will be used by visiting WSC 302 in the manner described below.

As part of step 333, visiting WSC 302 receives the call set-up message from home WSC 303 and compares the network address of calling WSC 301, home WSC 303 and itself. When, as in the present case, visiting WSC 302 determines that it and calling WSC 301 are in the same region (or country) and that home WSC 303 is in a different region (or country), and, therefore, that the call is traversing a regional or political boundary twice, then visiting WSC 302 determines that trunking of the call via home WSC 303 is disadvantageous and that the call should be routed from calling WSC 301 to visiting WSC 302 directly.

Therefore, at step 334, visiting WSC 302 transmits a call set-up response message (in response to the receipt of the call set-up message in step 333) to home WSC 303 to indicate that visiting WSC 302 and calling WSC 301 are in the same region (or country) and that home WSC 303 is in a different region (or country), and, therefore, that the call should not be routed through home WSC 303 but instead should be routed from calling WSC 301 to visiting WSC 302 directly. Advantageously, the call set-up message comprises the network address of visiting WSC 302.

As part of step 334, home WSC 303 receives the call set-up response message from visiting WSC 302 (in response to the transmission of call set-up message 333) to indicate that visiting WSC 302 and calling WSC 301 are in the same region (or country) and that home WSC 303 is in a different region (or country), and, therefore, that the call should not be routed through home WSC 303 but instead should be routed from calling WSC 301 to visiting WSC 302 directly.

Therefore, in response to the receipt of the call set-up response message in step 334, home WSC 303 ends the attempt to complete the call through itself and transmits another call set-up response message to calling WSC 301 to indicate that visiting WSC 302 and calling WSC 301 are in the same region (or country) and that home WSC 303 is in a different region (or country), and, therefore, that the call should not be routed through home WSC 303 but instead should be routed from calling WSC 301 to visiting WSC 302 directly. Advantageously, this call set-up response message comprises the network address of visiting WSC 302.

As part of step 335, calling WSC 301 receives the call set-up response message, and, therefore, ceases the attempt to route the call through home WSC 303.

At step 336, calling WSC 301 transmits a call set-up request message directly to visiting WSC 302 indicating the desire to set-up a call with wireless terminal 312. Advantageously, the call set-up request message comprises: (1) an indicium (e.g., the telephone or directory number, etc.) of the identity of wireless terminal 301 (e.g., for caller ID purposes, for billing purposes, etc.), (2) an indicium (e.g., the telephone or directory number, etc.) of the identity of wireless terminal 302 (for routing purposes).

At step 337, visiting WSC 302 completes the call to wireless terminal 312, which call proceeds directly from calling WSC 301.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:
   receiving at a first wireless switching center a first call set-up message from a second wireless switching center;
   transmitting, in response to said first call set-up message, a second call set-up message from said first wireless switching center to a third wireless switching center;
   receiving, in response to said second call set-up message, a first call set-up response message at said first wireless switching center from said third wireless switching center; and
   transmitting, in response to said first call set-up response message, a call set-up response message from said first wireless switching center to said second wireless switching center directing said second wireless switching center to set-up a call directly with said third wireless switching center.

2. The method of claim 1 wherein said first wireless switching center is in one region and said second wireless switching center and said third wireless switching center are in a second region.

3. The method of claim 1 wherein said first wireless switching center is in one country and said second wireless switching center and said third wireless switching center are in a second country.

4. The method of claim 1 wherein said first call set-up message comprises an E.212 address of said second wireless switching center.

5. The method of claim 1 wherein said second call set-up message comprises an E.212 address of said second wireless switching center.

6. The method of claim 1 wherein said first call set-up response message comprises an E.212 address of said second wireless switching center.

7. The method of claim 1 wherein said call set-up response message comprises an E.212 address of said third wireless switching center.

8. A method comprising:
   transmitting a first call set-up message from a first wireless switching center to a second wireless switching center, wherein said first wireless switching center and said second wireless switching center are located in different regions;
   receiving, in response to said first call set-up message, a call set-up response message at said first wireless switching center from said second wireless switching center to set-up a call directly with a third wireless switching center because said third wireless switching and said first wireless switching center are in the same region; and
   transmitting, in response to said call set-up response message, a second call set-up message from said first wireless switching center to said third wireless switching center.

9. The method of claim 8 wherein said second wireless switching center is in one country and said first wireless switching center and said third wireless switching center are in a second country.

10. The method of claim 8 wherein said first call set-up message comprises an E.212 address for said first wireless switching center.

11. The method of claim 8 wherein said call set-up response message comprises an E.212 address for said third wireless switching center.

12. A method comprising:

transmitting a first call set-up message from a first wireless switching center to a second wireless switching center; and receiving in response to said first call set-up message, a call set-up response message at said first wireless switching center from said second wireless switching center to set-up a call directly with a third wireless switching center; and transmitting, in response to said call set-up response message, a second call set-up message from said first wireless switching center to said third wireless switching center.

13. The method of claim 12 wherein said second wireless switching center is in one country and said first wireless switching center and said third wireless switching center are in a second country.

14. The method of claim 12 wherein said first call set-up message comprises an E.212 address for said first wireless switching center.

15. The method of claim 12 wherein said call set-up response message comprises an E.212 address for said third wireless switching center.

16. A method comprising:

receiving a first call set-up message at a first wireless switching center from a second wireless switching center, wherein said first call set-up message comprises an indicium of a region in which a third wireless switching center is located;

transmitting, in response to said first call set-up message, a first call set-up response message from said first wireless switching center to said second wireless switching center because said second wireless switching center is located in the same region as said third wireless switching center; and receiving, in response to said first call set-up response message, a second call set-up message at said first wireless switching center from said third wireless switching center.

17. The method of claim 16 wherein said second wireless switching center is in one region and said first wireless switching center and said third wireless switching center are in a second region.

18. The method of claim 16 wherein said second wireless switching center is in one country and said first wireless switching center and said third wireless switching center are in a second country.

19. The method of claim 16 wherein said first call set-up message comprises an E.212 address of said second wireless switching center.

20. The method of claim 16 wherein said first call set-up response message comprises an E.212 address of said first wireless switching center.

* * * * *